(12) United States Patent
Dietz et al.

(10) Patent No.: US 8,617,475 B2
(45) Date of Patent: Dec. 31, 2013

(54) EROSION RESISTANT MOUNTING MATERIAL AND METHOD OF MAKING AND USING THE SAME

(75) Inventors: Peter T. Dietz, Eagan, MN (US); Michael Patrick M. Mandanas, Little Canada, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 428 days.

(21) Appl. No.: 12/663,712

(22) PCT Filed: May 19, 2008

(86) PCT No.: PCT/US2008/064091
§ 371 (c)(1),
(2), (4) Date: Jul. 15, 2010

(87) PCT Pub. No.: WO2008/156942
PCT Pub. Date: Dec. 24, 2008

(65) Prior Publication Data
US 2011/0182777 A1 Jul. 28, 2011

Related U.S. Application Data

(60) Provisional application No. 60/943,688, filed on Jun. 13, 2007, provisional application No. 60/992,449, filed on Dec. 5, 2007.

(51) Int. Cl.
*B01D 50/00* (2006.01)
*B21D 51/16* (2006.01)

(52) U.S. Cl.
USPC .......................................... 422/179; 29/890

(58) Field of Classification Search
USPC .............................. 422/168, 179, 180; 29/890
See application file for complete search history.

(56) References Cited

U.S. PATENT DOCUMENTS

| 3,001,571 A | 9/1961 | Hatch |
| 3,795,524 A | 3/1974 | Sowman |

(Continued)

FOREIGN PATENT DOCUMENTS

| DE | 3514150 C1 | 4/1986 |
| EP | 0 639 700 B1 | 2/1995 |

(Continued)

OTHER PUBLICATIONS

PCT International Search Report and Written Opinion of the International Searching Authority, PCT/US2008/064091, mailed Sep. 10, 2008, 11 pages.

(Continued)

*Primary Examiner* — Tom Duong
(74) *Attorney, Agent, or Firm* — Bradford B. Wright (57) ABSTRACT

An erosion resistant mounting material comprises: a mounting material comprising inorganic fibers and having a peripheral edge; and a layer of reinforcing composition inwardly disposed on the inorganic fibers along the peripheral edge. The reinforcing composition comprises at least one compound represented by the formula: $(M^{m+})_d((Z_pO_q(OH)_r)^{n-})_e \cdot (H_2O)_f$ M represents a cationic species other than H; O represents oxygen; Z represents boron or phosphorus; f is a real number greater than or equal to zero; d, n, q, and r are integers greater than or equal to zero; e, m, and p are integers greater than or equal to one; and d times m equals e times n. The mounting material is useful in pollution control devices. A method of making the mounting material is also disclosed.

24 Claims, 2 Drawing Sheets

(56) References Cited

U.S. PATENT DOCUMENTS

| | | |
|---|---|---|
| 3,798,006 A | 3/1974 | Balluff |
| 3,916,057 A | 10/1975 | Hatch et al. |
| 3,948,611 A | 4/1976 | Stawsky |
| 4,047,965 A | 9/1977 | Karst et al. |
| 4,142,864 A | 3/1979 | Rosynsky et al. |
| 4,143,117 A | 3/1979 | Gaysert |
| 4,156,533 A | 5/1979 | Close et al. |
| 4,163,041 A | 7/1979 | Gaysert |
| 4,305,992 A | 12/1981 | Langer et al. |
| 4,396,664 A | 8/1983 | Mochida et al. |
| 4,521,333 A | 6/1985 | Graham et al. |
| 4,683,010 A | 7/1987 | Hartmann |
| 4,693,338 A | 9/1987 | Clerc |
| 4,929,429 A | 5/1990 | Merry |
| 4,999,168 A | 3/1991 | Ten Eyck |
| 5,008,086 A | 4/1991 | Merry |
| 5,207,989 A | 5/1993 | MacNeil |
| 5,212,279 A | 5/1993 | Nomura et al. |
| 5,332,609 A | 7/1994 | Corn |
| 5,380,580 A | 1/1995 | Rogers et al. |
| 5,714,237 A | 2/1998 | Cooprider et al. |
| 5,736,109 A | 4/1998 | Howorth et al. |
| 5,853,675 A | 12/1998 | Howorth |
| 5,882,608 A | 3/1999 | Sanocki et al. |
| 6,245,301 B1 | 6/2001 | Stroom et al. |
| 6,368,394 B1 | 4/2002 | Hughes et al. |
| 6,613,294 B2 | 9/2003 | Sanocki et al. |
| 6,864,199 B2 | 3/2005 | Doza et al. |
| 6,966,945 B1 | 11/2005 | Mazany et al. |
| 6,967,006 B1 | 11/2005 | Wirth et al. |
| 7,501,099 B2 * | 3/2009 | Sanocki et al. ............... 422/179 |
| 7,556,666 B2 | 7/2009 | Kunieda |
| 7,820,117 B2 | 10/2010 | Pelsert et al. |
| 7,851,403 B2 | 12/2010 | Kunieda et al. |
| 8,133,443 B2 * | 3/2012 | Merry ........................... 422/179 |
| 2004/0057879 A1 | 3/2004 | Aizawa et al. |
| 2004/0234428 A1 | 11/2004 | Tanahashi et al. |
| 2006/0154040 A1 | 7/2006 | Merry |
| 2006/0178064 A1 | 8/2006 | Balthes et al. |
| 2006/0230732 A1 | 10/2006 | Kunieda |
| 2006/0286014 A1 | 12/2006 | Peisert et al. |
| 2007/0084171 A1 | 4/2007 | Kaneko |
| 2007/0107395 A1 | 5/2007 | Zuberi et al. |
| 2008/0118682 A1 | 5/2008 | Ido et al. |
| 2008/0236122 A1 | 10/2008 | Ito |
| 2009/0291837 A1 | 11/2009 | Ohno et al. |
| 2010/0186359 A1 | 7/2010 | Dietz |
| 2010/0304152 A1 | 12/2010 | Clarke |

FOREIGN PATENT DOCUMENTS

| | | |
|---|---|---|
| EP | 0 639 701 A1 | 2/1995 |
| EP | 0 639 702 A1 | 2/1995 |
| EP | 0 835 365 B1 | 3/2000 |
| EP | 1 296 030 A | 3/2003 |
| FR | 2 869 948 | 11/2005 |
| GB | 1 476 183 | 6/1977 |
| JP | 49-113024 A | 10/1974 |
| JP | 4-348178 | 12/1992 |
| JP | 2000-240439 | 9/2000 |
| JP | 2001-164198 | 6/2001 |
| JP | 2003-097262 A | 4/2003 |
| JP | 2005-074243 | 3/2005 |
| JP | 2006-513966 | 4/2006 |
| JP | 2006-516699 | 7/2006 |
| WO | WO 97/48890 A1 | 12/1997 |
| WO | WO 00/11098 A1 | 3/2000 |
| WO | WO 2004/064996 A2 | 8/2004 |
| WO | WO 2004/070176 A1 | 8/2004 |
| WO | WO 2005/105427 A1 | 11/2005 |
| WO | WO 2007/143437 A2 | 12/2007 |
| WO | WO 2008/103525 A2 | 8/2008 |
| WO | WO 2008/154078 A1 | 12/2008 |
| WO | WO 2008/156918 A1 | 12/2008 |
| WO | WO 2008/156942 A1 | 12/2008 |

OTHER PUBLICATIONS

Chung, "Review—Acid aluminum phosphate for the binding and coating of materials", Journal of Materials Science, 2003, pp. 2785-2791, vol. 38.

Co-pending U.S. Appl. No. 12/526,564, entitled "Flexible Fibrous Material, Pollution Control Device, and Methods of Making the Same," 371(c) date Aug. 10, 2009.

Co-pending U.S. Appl. No. 12/663,613, entitled "Repositionable Mounting Material, Pollution Control Device, and Methods of Making the Same," 371(c) date Dec. 8, 2009.

Co-pending U.S. Appl. No. 12/663,720, entitled "Securable Mounting Material and Method of Making and Using the Same," transmitted Dec. 9, 2009.

Communication Pursuant to Article 94(3) EPC in EP application 08 755 851.6-2111, dated Apr. 20, 2010.

Office Action dated Aug. 13, 2012 in co-pending application U.S. Appl. No. 12/663,720, published as US 2010/0186359 A1.

* cited by examiner

EROSION RESISTANT MOUNTING MATERIAL AND METHOD OF MAKING AND USING THE SAME

CROSS-REFERENCE TO RELATED APPLICATIONS

This application is a national stage filing under 35 U.S.C. 371 of PCT/US2008/064091, filed May 19, 2008, which claims priority to U.S. Provisional Application No. 60/992,449, tiled Dec. 5, 2007 and U.S. Provisional Application No. 60/943,688, filed Jun. 13, 2007, the disclosures of which are incorporated by reference in their entirety herein.

BACKGROUND

Pollution control devices are employed on motor vehicles to control atmospheric pollution. Two types of such devices, catalytic converters and diesel particulate filters or traps, are currently in widespread use. Catalytic converters contain a catalyst, which is typically coated onto a monolithic structure mounted in the converter. The monolithic structures (termed "monoliths") are typically ceramic, although metal monoliths have been used. The catalyst oxidizes carbon monoxide and hydrocarbons, and reduces the oxides of nitrogen in automobile exhaust gases to control atmospheric pollution. Diesel particulate filters or traps are generally wall flow filters which have honeycombed monolithic structures (also termed "monoliths"), typically made from porous crystalline ceramic material.

Typically, as constructed, each type of these devices has a metal housing which holds within it a monolithic structure or element that can be metal or ceramic, and is most commonly ceramic. The ceramic monolith generally has very thin walls to provide a large amount of surface area and is fragile and susceptible to breakage. Moreover, there is a current industry trend regarding ceramic monoliths used in automotive catalytic converters toward monoliths having smoother outer surfaces that makes it more difficult to maintain adhesion of the mounting material to the ceramic monolith during canning. Ceramic monoliths also typically have coefficients of thermal expansion that are an order of magnitude less than typical metal housings (for example, stainless steel housings) in which they would be contained in use. To avoid damage to the ceramic monolith from road shock and vibration, to compensate for the thermal expansion difference, and to prevent exhaust gases from passing between the monolith and the metal housing, ceramic mat or intumescent sheet materials are often disposed between the ceramic monolith and the metal housing.

During use the leading edge of the mounting material can become eroded by hot exhaust gases, which may result in, for example, mechanical failure of the mounting material or exhaust gases passing through the mounting material and bypassing the monolith, or plugging of the ceramic monolith cells by free vermiculite or fiber fragments.

There are two methods currently in commercial use today to reduce erosion caused by exhaust gas impingement in pollution control devices. In the first method, known in the art as a "soft seal", an erosion resistant strip of polycrystalline mat is taped or otherwise adhered to the leading peripheral edge of a mounting mat prior to the canning step. The second method involves the application of a rigidizing solution to the leading peripheral edge of a mounting mat during the canning step. Typical application methods include dipping, spraying, or painting the solution onto the leading peripheral edge of the mounting mat, either just prior to inserting the mat wrapped monolith into the stainless steel shell or can, or it is dripped on the desired edge after the mat and monolith have been inserted into the shell or can. This process must be done during the canning process because the rigidizing solution, when dried, stiffens the edge of the support mat to an extent that it can't be wrapped around a monolith without causing the mounting mat to crack as it is being wrapped around the monolith. Wet processes such as this are inherently messy, and are typically undesirable.

SUMMARY

In one aspect, the present invention provides an erosion resistant mounting material comprising:
a mounting material comprising inorganic fibers and having a plurality of peripheral edges, the plurality of peripheral edges comprising a first peripheral edge; and
a layer of reinforcing composition inwardly disposed on the mounting material along the first peripheral edge, but not contacting a majority of the mounting material;
wherein, on a dry weight basis, at least one compound represented by the formula comprises a majority of the reinforcing composition, wherein
each $M^{m+}$ independently represents a cationic species, other than $H^+$, having a positive charge of m+; and
$(Z_pO_q(OH)_r)^{n-}$ represents a species having a charge of n−, wherein Z represents boron or phosphorus, and further wherein:
f is a real number greater than or equal to zero;
d, n, q, and r are integers greater than or equal to zero;
e, m, and p are integers greater than or equal to one; and
d times m equals e times n; and
wherein the erosion resistant mounting material is flexible.

In certain embodiments, an additional layer of the reinforcing composition may be inwardly disposed on the mounting material along a second peripheral edge, As used herein: the term "flexible" means capable of passing the Flexibility Test included hereinbelow; the term "layer" excludes anything that extends throughout the entire mounting material; and the superscript term "+" refers to positive charge, while the superscript term "−" refers to negative charge. Additionally, in the case where d is zero, then n is necessarily also zero, and the quantity $(Z_pO_q(OH)_r)$ will have no net charge.

Erosion resistant mounting material according to the present invention may be adapted for use in a pollution control device. Accordingly, in another aspect, the present invention provides a pollution control device comprising: a housing; a pollution control element disposed within the housing; and erosion resistant mounting material according to the present invention between the pollution control element and the housing.

In another aspect, the present invention provides a method of making a pollution control device, the method comprising: disposing the erosion resistant mounting material according to the present invention within a housing having a pollution control element disposed therein such that the erosion resistant mounting material is disposed between the pollution control element and the housing.

In yet another aspect, the present invention provides a method of making an erosion resistant mounting material, the method comprising:

providing a mounting material comprising inorganic fibers and a plurality of peripheral edges, the plurality of peripheral edges comprising a first peripheral edge; and applying a dryable solution comprising a reinforcing composition dissolved in a liquid vehicle to the inorganic fibers along the first peripheral edge; and substantially drying the dryable solution to provide a layer comprising the reinforcing composition inwardly disposed along the first peripheral edge, but not contacting a majority of the mounting material;

wherein, on a dry weight basis, at least one compound represented by the formula comprises a majority of the reinforcing composition, wherein each $M^{m+}$ independently represents a cationic species, other than $H^+$, having a positive charge of $m^+$; and $(Z_pO_q(OH)_r)^{n-}$ represents a species having a charge of $n-$, wherein Z represents boron or phosphorus, and further wherein:

f is a real number greater than or equal to zero;

d, n, q, and r are integers greater than or equal to zero;

e, m, and p are integers greater than or equal to one; and d times m equals e times n; and wherein the erosion resistant mounting material is flexible.

In certain embodiments, said at least one compound wherein said at least one compound is selected from the group consisting of boric acid, borate salts, phosphoric acid, phosphate salts, hydrates of the foregoing, and combinations thereof. In certain embodiments, each $M^{m+}$ is independently selected from the group consisting of metal cations and $NR_4^+$ wherein each R independently represents H or an alkyl group. In certain embodiments, the reinforcing composition is essentially free of organic components. In certain embodiments, at least a portion of the inorganic fibers are bonded together by a binder. In certain of those embodiments, the binder comprises organic material.

In certain embodiments, the mounting material has a dry basis weight of from 0.4 to 15 kilograms per square meter. In certain embodiments, the mounting material further comprises an unexpanded intumescent material. In certain of those embodiments, the unexpanded intumescent material comprises vermiculite, graphite, or a combination thereof. In certain embodiments, the inorganic fibers comprise ceramic fibers. In certain embodiments, the layer of reinforcing composition has an inward thickness of less than or equal to one centimeter. In certain embodiments, the method further comprises adapting the erosion resistant mounting material for use in a pollution control device.

Erosion resistant mounting material according to the present invention is first of all flexible, which enables it to be wound around a typical monolith without fracture or breakage. Further, when used in pollution control devices such as those described hereinabove, the erosion resistant mounting material imparts a degree of erosion resistance to exhaust gases. Further, the erosion resistant mounting material is generally easy to manufacture and does not require additional steps such as the application of a rigidizing solution to the leading edge of the mounting material during the canning process.

As used herein the term "dryable" means that any liquid vehicle present may be at least substantially removed by evaporation.

DETAILED DESCRIPTION

Figure 1:
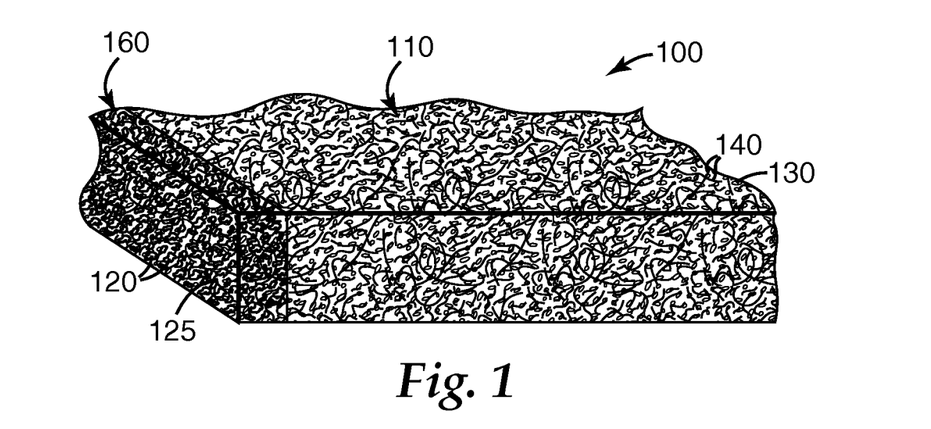
FIG. 1 is a schematic perspective view of an exemplary erosion resistant mounting material according to one embodiment the present invention.

FIG. 1 shows an exemplary erosion resistant mounting material 100 according to the present invention. Referring now to FIG. 1, mounting material 110 has inorganic fibers 140, optionally bonded together by a binder (not shown), and optional unexpanded intumescent particles 130. Mounting material 110 has a plurality of peripheral edges that include first and second peripheral edges 125, 122, respectively. Layer of reinforcing composition 160 comprises reinforcing composition 120 inwardly disposed on the inorganic fibers 140 along first peripheral edge 125, but does not contact a majority of the mounting material 110.

If desired, a second layer of reinforcing composition may optionally be similarly disposed along a second peripheral edge opposite the original peripheral edge.

The mounting material comprises inorganic fibers that are sufficiently entangled and/or bonded together to form a cohesive web. The fibers may be entangled by a mechanical process (for example, needletacking or hydroentangling) and/or bonded together using a binder (for example, organic binder, inorganic binder, or a combination thereof). In some embodiments, the mounting material may also include organic fibers, although typically included in minor amounts, if at all.

Useful inorganic fibers include for example, fiberglass, ceramic fibers, non-oxide inorganic fibers such as stainless steel fibers or boron fibers, and mixtures thereof.

Useful ceramic fibers include, for example, aluminoborosilicate fibers, aluminosilicate fibers, alumina fibers, heat-treated versions thereof, and mixtures thereof. Examples of suitable aluminoborosilicate fibers include those commercially available under the trade designations "NEXTEL 312 CERAMIC FIBERS", "NEXTEL 440 CERAMIC FIBERS", and "NEXTEL 550 CERAMIC FIBERS" from 3M Company, St. Paul, Minn. Examples of suitable aluminosilicate fibers include those available under the trade designations "FIBERFRAX" 7000M from Unifrax Corp., Niagara Falls, N.Y., "CERAFIBER" from Thermal Ceramics, Augusta, Ga.; and "SNSC Type 1260 D1" from Nippon Steel Chemical Company, Tokyo, Japan. Examples of suitable commercially available alumina fibers include polycrystalline alumina fibers available from Saffil, Widnes, England under the trade designation "SAFFIL". Suitable ceramic fibers are also disclosed in U.S. Pat. No. 3,795,524 (Sowman) and U.S. Pat. No. 4,047,965 (Karst et al.).

Examples of other suitable inorganic fibers include: quartz fibers, amorphous and crystalline fibers of high silica content, alumina fibers and high alumina fibers, amorphous and crystalline alumina-silica fibers, oxide and non-oxide fibers, metallic fibers, fibers formed by blowing, spinning and pulling from a melt, sol-gel formed fibers, fibers formed from organic precursors, glass fibers, leached glass fibers, and other fibers of a substantially inorganic composition. Suitable inorganic fibers may also comprise a surface coating or a sizing of organic and inorganic material. Suitable inorganic fibers may obviously be used alone or in combination with other suitable inorganic fibers.

Generally speaking, inorganic fibers containing a substantial amount of shot are less expensive than shot-free, or partially cleaned inorganic fibers. However, shot-free inorganic fibers generally provide more resilient articles (for example, webs, sheets, mats), which better maintain holding forces at all temperatures including a return to room temperature. Accordingly, the mounting material may contain less than 50, 30, or even less than 15 percent by weight, or less, of shot based on the total dry weight of the mounting material.

Suitable organic binders for the mounting material are known in the art and include polymers and elastomers in the latex form (for example, natural rubber latexes, styrene-butadiene latexes, butadiene-acrylonitrile latexes, and latexes of acrylate and methacrylate polymers and copolymers). Typically, as is known in the art organic binders are flocculated onto the fibers of the web using a flocculating agent, especially during wet laid manufacturing processes. Suitable inorganic binders are known in the art for such use and include tetrasilisic fluorine mica, in either the water-swelling unexchanged form or after flocculation as the exchanged salt with a divalent or polyvalent cation, and bentonite.

Optionally, the mounting material may comprise one or more intumescent materials (which may be unexpanded, partially expanded, expanded, or a mixture thereof), typically, depending on the desired end use. For example, for use at temperatures above about 500° C., unexpanded vermiculite materials are suitable since they start to expand at a temperature range of from about 300° C. to about 340° C. This may be useful to fill the expanding gap between an expanding metal housing and a monolith in a catalytic converter. For use at temperatures below about 500° C., such as in diesel monoliths or particulate filters, expandable graphite or a mixture of expandable graphite and unexpanded vermiculite materials may be desired since expandable graphite starts to expand or intumesce at about 210° C. Treated vermiculites are also useful and typically expand at a temperature of about 290° C.

Examples of useful intumescent materials include unexpanded vermiculite flakes or ore, treated unexpanded vermiculite flakes or ore, partially dehydrated vermiculite ore, expandable graphite, mixtures of expandable graphite with treated or untreated unexpanded vermiculite ore, hydrobiotite, water-swellable synthetic tetrasilicic fluorine type mica (for example, as described in U.S. Pat. No. 3,001,571 (Hatch)), alkali metal silicate granules (for example, as described in U.S. Pat. No. 4,521,333 (Graham et al.)), processed expandable sodium silicate (for example, insoluble sodium silicate commercially available under the trade designation "EXPANTROL" from 3M Company), and mixtures thereof. An example of a commercially available expandable graphite material is that available under the trade designation "GRAFOIL Grade 338-50" expandable graphite flake, from UCAR Carbon Co., Cleveland, Ohio. Treated unexpanded vermiculite flakes or ore includes unexpanded vermiculite treated by processes such as by being ion exchanged with ion exchange salts such as ammonium dihydrogen phosphate, ammonium nitrate, ammonium chloride, potassium chloride, or other suitable compounds as is known in the art.

Factors to consider in choosing an intumescent sheet material typically include the use temperature and the type of monolith (for example, ceramic monolith or metallic monolith). Suitable intumescent sheet materials typically comprise unexpanded vermiculite ore (commercially available, for example, from W. R. Grace and Co., Cambridge, Mass.), organic binder and/or inorganic binder, ceramic fibers, and filler (for example, clay (for example, kaolin) and hollow ceramic beads or bubbles). For example, U.S. Pat. No. 3,916,057 (Hatch et al.), discloses intumescent sheet material comprising unexpanded vermiculite, inorganic fibrous material, and inorganic binder. U.S. Pat. No. 4,305,992 (Langer et al.), discloses intumescent sheet material comprising ammonium ion-treated vermiculite, inorganic fibrous material, and organic binder. Further, intumescent sheet material is commercially available, for example, from the 3M Company of St. Paul, Minn., under the trade designation "INTERAM MAT MOUNT."

Typically, the mounting material comprises, on a dry weight basis, from 30 to 99.5 percent by weight of the inorganic fibers (for example, from 40 to 98.5 percent by weight, from 50 to 97 percent by weight, or from 60 to 97 percent by weight), from 0.5 to 12 percent by weight of an inorganic and/or organic binder (for example, from 0.5, 1.0, or 1.5 up to 3, 4, 5, 6, 7, 8, 9, 10, 11, or 12 percent by weight), and optionally up to 60 percent by weight of intumescent material, although compositions falling outside this range may also be used. In embodiments wherein intumescent material is not included in the mounting material, the percentage of inorganic fibers on a dry weight basis is typically at least 85 (for example, at least 90, 91, 92, 93, 94, 95 percent by weight, or more) percent, although lower weight percentages may also be used.

The mounting material may optionally contain one or more inorganic fillers, inorganic binders, organic binders, organic fibers, and mixtures thereof.

Examples of fillers include delaminated vermiculite, hollow glass microspheres, perlite, alumina trihydrate, calcium carbonate, and mixtures thereof. Fillers may be present in the mounting material at levels of up to 5 percent, up to 10 percent, or even up to 25 percent, or more, although use of high levels of fillers may tend to reduce the resiliency of the mounting material.

Examples of inorganic binders include micaceous particles, kaolin clay, bentonite clay, and other clay-like minerals. Inorganic binders may be present in the mounting material at levels up to 5 percent, up to 10 percent, up to 15 percent, or more, based on the dry weight of the mounting material, although use of high levels of inorganic binders may tend to reduce the resiliency of the mounting material.

Optionally, organic fibers (for example, staple fibers or fibrillated fibers) may be included in the mounting material of the present invention, for example, to provide wet strength during processing and dry strength and resiliency to mat and sheet mounting materials prior to canning. However, in general, it is desirable to minimize the content of such fibers as they contribute to objectionable burn off.

Other additives or process aides that may be included in mounting material according to the present invention include defoaming agents, surfactants, dispersants, wetting agents, salts to aid precipitation, fungicides, and bactericides.

The mounting material is typically formulated to have physical properties suitable for in pollution control devices, although it may be formulated with different physical properties if desired.

The erosion resistant mounting material can be manufactured to any desired size and shape; for example, depending on specific application requirements. For example, automobile catalytic converters typically are smaller than diesel converters and generally require a correspondingly smaller mounting mat. Mounting mats can be stacked so that more than one layer of mat is wrapped around a monolith. Typically, the thickness of each intumescent erosion resistant mounting material is in the range from about 1.5 mm to about 20 mm, although other thicknesses (for example, thinner or thicker) may be used.

Typically, the mounting material has a dry basis weight in a range of from about 400 g/m² to about 15 kg/m², although basis weights outside of this range may also be used. Moreover, the mounting material may have a tensile strength of at least 7.3 pounds per square inch (psi, 50 kPa), typically at least 15.5 psi (100 kPa), and more typically at least 315 psi (200 kPa) (for example, in a range of from 200–300 kPa).

The reinforcing composition comprises (for example, consists essentially of, or even consists of) at least one compound represented by the formula:

$$(M^{m+})_d ((Z_p O_q (OH)_r)^{n-})_e \cdot (H_2O)_f$$

capable of rendering the first peripheral edge of the mounting material erosion resistant toward hot exhaust gases of the type found in vehicle exhaust systems. In general, the compounds described by the above formula, other than boric acid and phosphoric acid, are salts (for example, water-soluble or water-insoluble salts). On a dry weight basis, said at least one compound comprises a majority of the reinforcing composition. For example, on a dry weight basis, said at least one compound may comprise greater than 50, 55, 60, 65, 70, 75, 80, 85, 90, or even greater than 95 percent by weight of the reinforcing composition.

Each quantity $M^{m+}$ independently represents a cationic species, other than $H^+$, having a charge of m+. Examples of suitable cationic species include: metal ions such as, for example, $Li^+$, $Na^+$, $K^+$, $Mg^{2+}$, $Ca^{2+}$, $Al^{3+}$, $Fe^{3+}$, $Cr^{3+}$, $Cr^{6+}$, $Ni^{2+}$, or $Zn^{2+}$; ammonium; and organic cations such as for example, sulfonium, phosphonium, and ammonium (for example, mono-, di-, tri-, or tetraalkylammonium, and benzalkonium); and organometallic cations. If alkali metal cations are used, they should be used judiciously as they may flux the inorganic fibers and have a detrimental effect on mat resiliency at temperatures above about 800° C.

The quantity f is a real number greater than or equal to zero (for example, 0, 1, 2, 3.4, 4.7, etc.) recognizing the existence of both integral and fractional hydrates. The quantities d, n, q, and r are integers greater than or equal to zero (for example, 0, 1, 2, 3, etc.). The quantities e, m, and p are integers greater than or equal to one (for example, 1, 2, 3, 4, etc.).

Each quantity $(Z_p O_q (OH)_r)^{n-}$ represents a species having a charge of n−, wherein Z represents boron or phosphorus. Since d·m=e·n, n is zero when d is zero. Examples of compounds having n equal to zero include boric acid, phosphoric acid, polyphosphoric acid, and hydrates thereof.

Examples of compounds that may be included in the reinforcing composition include boric acid, borax, phosphoric acid, magnesium phosphate (for example, as prepared by sequential application of magnesium hydroxide and phosphoric acid and subsequent application), aluminum dihydrogen phosphate, and borate esters (which spontaneously hydrolyze to form boric acid on contact with water or steam).

Certain phosphate salts encompassed by the present invention may tend to rigidify the mounting material if heated to temperatures above about 150° C. Accordingly, they should be dried at lower temperatures.

In some embodiments, minor amounts of colloidal material (for example, a silica or alumina sol) may also be present in the solution; however, such materials tend to impart stiffness to the erosion resistant mounting material, and should typically be used judiciously in minor amounts.

In some cases, it may be desirable to use two solutions in sequence, for example, if the compounds in each solution are reactive toward one another (for example, to cause precipitation).

To facilitate proper installation in pollution control devices, the reinforcing composition may further comprises a colorant that visually indicates the located of the reinforcing material. Exemplary colorants include pigments and/or dyes.

The reinforcing composition may optionally further contain additional non-interfering components such as colorants fragrances, thickeners, surfactants, dispersants, humectants, flame retardants, biocides, and the like.

To minimize initial burnout that may tend to reduce the effectiveness of components (for example, a catalytic converter monolith), the reinforcing composition may have a low content of organic components (whether organic cationic species, organic anionic species, or neutral organic compounds). For example, on a dry weight basis, the reinforcing composition may have an organic component content of less than 20, less than 10, or even less than 5 percent of the total weight of the reinforcing composition. Advantageously, the reinforcing composition may be formulated such that it is essentially free (that is, contains less than one percent of the total weight of the reinforcing composition on a solids basis), or even completely free of organic components.

In formulating the reinforcing composition and deciding the application levels care should be taken to ensure that the erosion resistant mounting material remains capable of passing the Flexibility Test as this is one significant benefit of the present invention. The specific choice of application level and manner of application will be readily determined by those of ordinary skill in the art and will typically depend, for example, on the mounting material used, the particular reinforcing material and its concentration in solution, and the desired depth of penetration into the mounting material from its edge.

Similarly, erosion resistance is imparted to a peripheral edge of the mounting material upon exposure to hot exhaust gases results in the reinforcing composition bonding with components of the mounting material. Advantageously, erosion resistant mounting material according to the present invention can be conveniently manufactured without the need of cumbersome retaining means such as screens or tapes to retain an edge protectant, and are typically easier to handle during installation in a pollution control device than commercially available erosion resistant mounting materials, Moreover, by applying the reinforcing layer along the peripheral edge, it is generally possible to retain much of the resiliency characteristic of the mounting material.

The reinforcing composition can typically be handled as a solution (for example, a dryable solution) of the abovementioned compound(s) in a liquid vehicle that is applied to the mounting material by a suitable method such as, for example, dipping, roll coating, spraying, or painting, and subsequent removal of the liquid vehicle. The liquid vehicle may comprise, for example, water, organic solvent, or an aqueous vehicle (that is, containing water and a water soluble organic solvent).

Typically, a solution of the reinforcing composition will have a solids content in a range of from about 1 to about 20 percent by weight, more typically from about 2 to about 15 percent, and still more typically in a range of from about 5 to about 10 percent, however higher or lower concentrations may be used as desired for specific material requirements (for example, up to about 85 percent by weight phosphoric acid may be used). In general, higher coating weights of the reinforcing composition (for example, achieved by use of a higher concentration of reinforcing composition in solution) lead to equal or better erosion resistance, but lessened flexibility than lower coating weights. Accordingly, the inward depth of the layer of reinforcing material (that is, toward the center of the mounting material) and its total coating weight are typically kept to a minimum necessary to achieve a desired level of erosion resistance. In contrast, a mounting material wherein the layer of reinforcing material is extended throughout the entirety of the mounting material (with a corresponding increase in the total coat weight of the reinforcing material) it loses a degree of flexibility and resiliency as compared to the erosion resistant mounting material of the present invention.

Typically, sufficient solution is applied along the peripheral edge that the entire edge is coated, although a small degree of minor coating defects may be acceptable in some cases. Once applied, the solution(s) penetrates into the interior of the mounting material, to form a layer (for example, a stripe) leaving behind, after removal of the liquid vehicle, a layer of reinforcing composition; for example, having an inward thickness (that is, distance from the peripheral edge) of less than or equal to 5, 4, 3, 2, or even less than or equal to one centimeter, although greater inward thicknesses may also be used as long as the entire mounting material is not coated by the reinforcing composition.

Removal of the liquid vehicle may be accomplished by methods such as for example, evaporation at room temperature or at elevated temperature. Typically, lower drying temperatures are more desirable since heating at elevated temperatures (for example, above about 150° C.) may tend to rigidify the reinforcing composition. Similarly, in some embodiments it may be desirable to include a humectant in the reinforcing composition to improve flexibility.

Erosion resistant flexible mounting materials according to the present invention may have any dimension and/or thickness. However, for use in pollution control devices the thickness of the erosion resistant flexible mounting material, and likewise the mounting material is typically in a range of from 0.1 inch (0.3 cm), 0.15 inch (0.38 cm), or 0.2 inch (0.5 cm) up to 0.3 (0.8 cm), 0.5 (1.3 cm), 0.7 (1.8 cm) or 1 inch (2.5 cm), or more.

Typically, the mounting material has a dry basis weight in a range of from 400, 700, 1000, 1500, or even 2000 grams per square meter (gsm) up to 5000, 10000, or 15000 gsm, or more. For example, non-intumescent mounting materials typically have a dry basis weight of from 400 to 2500 gsm, more typically 1000 to 1800 gsm. Intumescent mounting materials typically have a dry basis weight of from 1200 to 15000 gsm, more typically 2400 to 8000 gsm. The mounting material may be made by any suitable technique including; for example, using air laid or wet laid techniques that are well known in the art.

In one exemplary useful method, a slurry in water (for example, typically greater than 95 percent by weight water) of the inorganic fibers, and an organic polymer, is prepared and combined with a flocculent. Optional ingredients (for example, defoaming agent, intumescent material or filler) are then added (if used) and the slurry is then formed into mounting material by traditional wet-laid non-woven papermaking techniques. Briefly, this process includes mixing the components and pouring the slurry onto a wire mesh or screen to remove most of the water. The formed sheet is then dried to form the mounting material. The mounting material may then be converted to desired forms such as sheets and mats. The process may be carried out in a step-wise, batch, and/or continuous fashion.

When making the slurry, higher density materials such as the optional intumescent material and higher density fillers (if used) may be added to the slurry in a smaller volume mixing vessel at a constant rate just prior to the depositing step. Slurries containing fillers and intumescent materials are agitated sufficiently so to prevent these particles from settling out in the mixing tank prior to pouring the slurry onto the mesh. Such slurries should typically be partially dewatered almost immediately after being deposited on the mesh so to prevent undesirable settling of the higher density particles. Vacuum dewatering of the slurries is desirable. Useful drying methods include wet pressing the dewatered slurries through compression or pressure rollers followed by passing the material through heated rollers and forced hot air drying as is known in the art.

Erosion resistant mounting material according to the present invention is useful in pollution control devices as mounting material (for example, a mounting mat) for mounting a monolith in a housing and/or for end cone insulation. For example, the erosion resistant mounting material may be disposed between the monolith and the housing by wrapping the monolith with the erosion resistant mounting material and inserting the wrapped monolith into the housing, or by wrapping the inner end cone housing with the erosion resistant mounting material and then welding the outer end cone housing to the inner end cone housing. As mounted, the reinforcing composition treated peripheral edge of the erosion resistant mounting material is generally directed toward the upstream portion of the exhaust path, although backside turbulence should also be considered.

The reinforcing composition is activatable by heat. Once activated (for example, from hot exhaust gases, flame, or an oven prior to installation on the vehicle), it enhances erosion resistance of the edge of the mounting material proximate which it is disposed. Typically, a temperature in a range of from about 150° C. to about 300° C. activates the reinforcing composition, although temperatures outside this range may also be used. Activation may be achieved by exposure to the inherent temperature of a pollution control device (for example, a catalytic converter). In cases where a pollution control device has an operational temperature that is less than the activation temperature of the reinforcing material, heating the pollution control device to a temperature in excess of the activation temperature prior to installing it on a vehicle may be advantageous.

Figure 2:
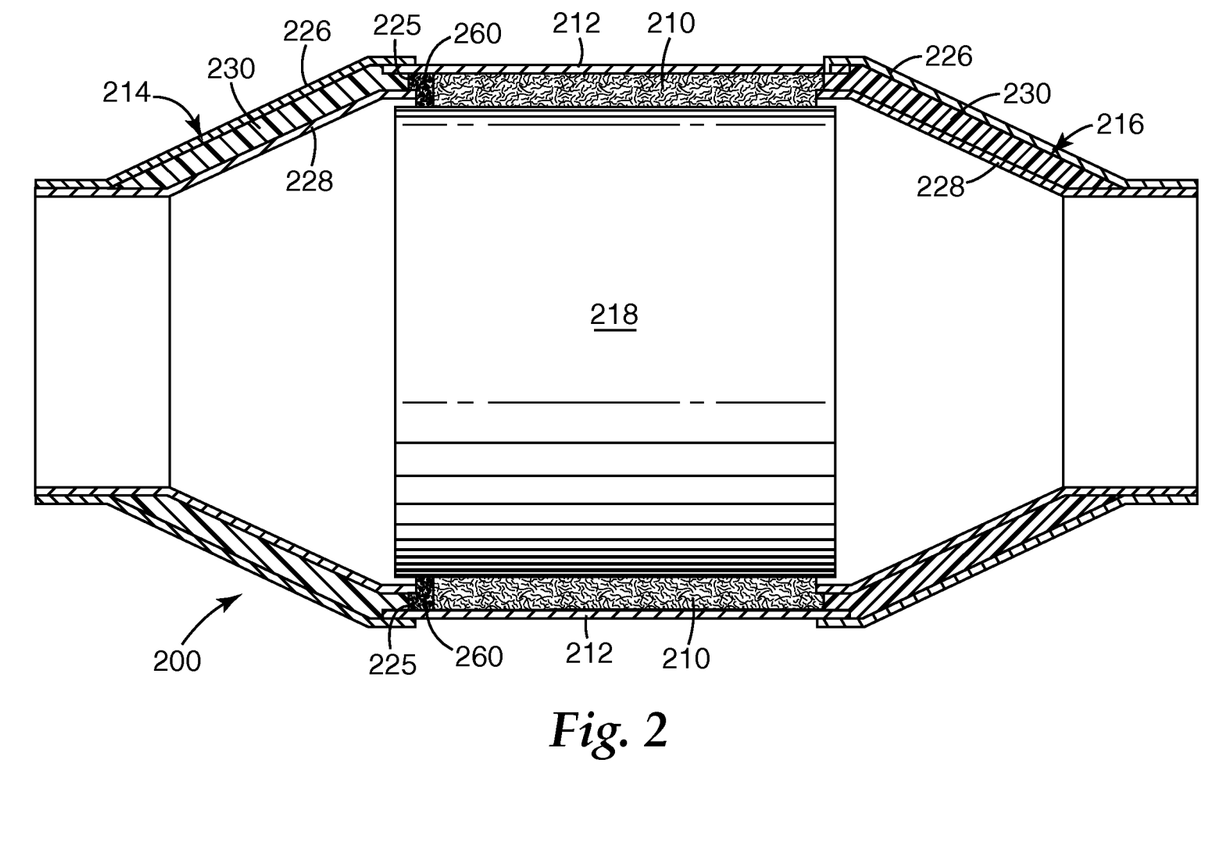
FIG. 2 is a cross-sectional view of an exemplary pollution control device according to one embodiment of the present invention.

Referring now to FIG. 2, exemplary pollution control device 200 includes housing 212 and has a generally conical inlet 214 and outlet 216 (that is, commonly referred to as end cones). Housing 212, which is commonly referred to as a can or a casing, is usually made of metal (for example, stainless steel). Disposed within housing 212 is monolith 218 usually made of a ceramic or metallic material, and which may include a catalyst. Erosion resistant mounting material 210 surrounds monolith 218. First edge 225 of erosion resistant mounting material 210 with layer of reinforcing composition 260 is oriented toward inlet 214. Monolith 218 may be, for example, a catalytic converter element or a diesel particulate filter element.

Inlet 214 and outlet 216 include an inner end cone housing 228 and an outer end cone housing 226. Insulation material 230 is positioned between the inner end cone housing 228 and the outer end cone housing 226. Erosion resistant flexible mounting material according to the present invention may be used as insulation material 230. If so, the layer of reinforcing composition is typically oriented toward the monolith, but this is not a requirement.

Many examples of pollution control devices are known in the art and include, for example, catalytic converters, end cone sub-assemblies, selective catalytic reduction (SCR) units, and diesel particulate traps and filters. Further details concerning such devices may be found, for example, in U.S. Pat. No. 5,882,608 (Sanocki et al.), U.S. Pat. No. 6,245,301 (Stroom et al.) and RE 27,747 (Johnson), and in U.S. Publ. Pat. Appln. No. 2006/0154040 A1 (Merry).

Objects and advantages of this invention are further illustrated by the following non-limiting examples, but the particular materials and amounts thereof recited in these examples, as well as other conditions and, details, should not be construed to unduly limit this invention.

EXAMPLES

Unless otherwise noted, all parts, percentages, ratios, etc. in the Examples and the rest of the specification are by weight. In the Tables below, the term "NM" means "not measured".

The abbreviations listed in Table 1 (below) are used throughout the Examples.

TABLE 1

| ABBREVI-ATION | MATERIAL |
|---|---|
| BX | borax, available under the trade designation "20-MULE TEAM BORAX" from Dial Corp., Scottsdale, AZ |
| MAP | aluminum dihydrogen phosphate, $Al(H_2PO_4)_3$, (50 weight percent in water), available from Alfa-Aesar, Ward Hill, MA |
| MAT1 | an intumescent ceramic fiber web (4070 grams per square meter, 6.1 mm thickness) available under the trade designation "INTERAM 100" from 3M Company, St. Paul, MN |
| MAT2 | a non-intumescent ceramic fiber web (1400 grams per square meter, 6 mm thickness) available under the trade designation "INTERAM 900HT" from 3M Company |
| MAT3 | a non-intumescent ceramic fiber web (1000 grams per square meter, 7.2 mm thickness) available under the trade designation "INTERAM 1100HT" from 3M Company |
| MAT4 | a non-intumescent ceramic fiber web (2100 grams per square meter, 14.5 mm thickness) available under the trade designation "INTERAM 1100HT" from 3M Company |
| MAT5 | an intumescent ceramic fiber web (5300 grams per square meter, 12 mm thickness) available under the trade designation "INTERAM 700" from 3M Company |
| MGPHOS | a magnesium phosphate solution prepared by dissolving 25 grams of magnesium hydroxide into 200 grams of 42.5% phosphoric acid under constant mixing, then diluted with equal parts by weight of water and two drops of SURF2 per 100 grams of solution |
| RIGB | a colloidal silica solution available under the trade designation "CEPROTEC RIGIDIZER B" from CeProTec GmbH, Langenfeld, Germany |
| RIGW | an aqueous amorphous silica dispersion available under the trade designation "UNIFRAX RIGIDIZER W" from Unifrax Corporation, Niagara Falls, NY |
| SIL1 | 30 weight percent colloidal silica available under the trade designation "NALCO 1030", Nalco Company, Naperville, IL |
| SURF1 | ethoxylated alkylamine dispersant available under the trade designation "NALCO 8493" from Nalco Company |
| SURF2 | nonionic surfactant available under the trade designation "ICONOL TDA-9" from BASF Corp., Florham Park, NJ |
| PHOS | phosphoric Acid, reagent grade assay: 86.9% available from J. T. Baker, Phillipsburg, NJ |
| CAL | colloidal alumina, 20 percent by weight $Al_2O_3$, available under the trade designation "NYACOL AL20" from Nyacol Nanotechnologies, Ashland, MA |

Test Methods:
Flexibility Test:

A specimen to be tested is sized (typically cut) to form a strip, 1 inch (2.5 cm) wide×7 inches (18 cm) long, such that any reinforcing composition that is present lies along a 7-inch (18-cm) side (that is, a treated edge). The specimen is wrapped lengthwise around a 2.5-inch (6.4-cm) diameter steel mandrel such that the treated edge (if any) is wrapped around the circumference of the mandrel. The specimen passes this test if it conforms to the circumference of the mandrel without cracking in half or breaking into large ridged segments. A small degree of surface cracking is acceptable. Any specimen that cracks through the majority of the entire thickness of the specimen is considered a failure.

Cold Erosion Test:

While preserving the integrity of the treated edge, a specimen to be tested is cut into a square measuring one inch by one inch (2.54 cm by 2.54 cm), weighed, and mounted horizontally between two metal plates (nickel/chromium alloy, available under the trade designation "INCONEL 601" from Inco Alloys International, Huntington, W. Va.) using metallic spacers to obtain a desired mount density and leaving the treated edge exposed. Mount density is achieved by compressing the specimen evenly between the metallic spacers to a uniform thickness. The mount density is then calculated as the basis weight of the specimen divided by the thickness of the compressed specimen. The resultant assembly is heated for two hours at 800° C., and then cooled to room temperature. The weight after binder burn out is recorded.

The assembly is then positioned at a distance of 3.8 mm in front of an air jet oscillating back and forth over the treated edge of the mat at 20 cycles per minute for 24 hrs. The air jet impinges on the treated edge of the specimen at a velocity of 178 meters per second. The specimen is re-weighed to determine weight loss. The erosion rate is determined by the weight loss after binder burnout divided by the time of the test and is reported in grams lost per hour (g/hr).

Hot Erosion Test:

While preserving the integrity of the treated edge, a specimen to be tested is cut into a square measuring one inch by one inch (2.54 cm by 2.54 cm), weighed, and mounted horizontally between two metal plates (nickel/chromium alloy, available under the trade designation INCONEL 601 from Inco Alloys International, Huntington, W. Va.) using metallic spacers to obtain a desired mount density and leaving the treated edge exposed. The resultant assembly is heated for two hours at 800° C., and then cooled to room temperature. The weight after binder burn out is recorded.

The assembly is then positioned at a distance of 3.8 mm in front of an air jet heated at 500° C. oscillating back and forth over the treated edge of the mat at 20 cycles per minute for 24 hrs. The air jet impinges on the treated edge of the specimen at a velocity of 178 meters per second. The upper metal plate is heated at 800° C. and the lower metal plate is heated at 475° C. After 24 hours the specimen is cooled and re-weighed to determine weight loss. The erosion rate is determined by the weight loss after binder burnout divided by the time of the test and is reported in grams lost per hour (g/hr).

Examples 1A-23 And Comparative Examples A-G

Various edge treatments were applied to MAT1 according to the following procedure. The edge treatment material was dissolved in the indicated solvent(s) and allowed to stabilize over night.

Specimens, 7 inches (18 cm)×7 inches (18 cm), of MAT1 were cut from a common roll. One edge of each sample was dipped into a shallow pan containing a solution as indicated in Table 2. The pan was a 9 inches×12 inches (23 cm×30.5 cm) and about 1 inch deep (2.5 cm). The pan was position with a slight incline (15 degrees) to concentrate the solution to the 9 inch side of the pan. Typically, less than five seconds was enough time to allow capillary action to wick the solution evenly into the support mat. The procedure was repeated for each experimental condition. After the samples were dipped in the solution they were allowed to dry overnight at room temperature.

Two drops of SURF1 was added for every 100 grams of water-based solution to aide absorption into the mat. Prior to application, water-based solutions, and the pan were heated to 80° C. Samples in other solvents were applied at room temperature. The specimens were tested according to the Cold Erosion Test. The mount density was 0.7 g/cm³. The observed erosion rate in grams per hour is reported in Table 2 (below), wherein Examples 17-23 and Comparative Example G represent single data points and accordingly a standard deviation cannot be calculated.

TABLE 2

| EXAMPLE | SOLUTION | | | COATING WEIGHT, Grams | | EROSION RATE, gram/hour | FLEXIBILITY TEST, pass/fail |
| | Material | Added Solvent | Percent Solids By Weight | Wet | Calculated Dry Add On Weight | (Standard Deviation, gram/hour) | |
|---|---|---|---|---|---|---|---|
| Comparative Example A | none | none | not applicable | not applicable | not applicable | 0.0356 (0.0064) | pass |
| Comparative Example B1 | RIGW | none | 30 | 10.5 | 3.15 | 0.002 (0.0005) | NM |
| Comparative Example B2 | RIGW | none | 30 | 10 | 3.0 | NM | fail |
| Comparative Example B3 | RIGW | none | 30 | 5 | 1.5 | NM | fail |
| Comparative Example C1 | RIGB | none | 30 | 10.35 | 3.15 | 0.0018 (0.0006) | NM |
| Comparative Example C2 | RIGB | none | 30 | 10 | 3.0 | NM | fail |
| Comparative Example C3 | RIGB | none | 30 | 5 | 1.5 | NM | fail |
| 1A | boric acid | methanol | 20 | 9 | 1.8 | 0.0066 | NM |
| 1B | boric acid | methanol | 20 | 10 | 2.0 | NM | pass |
| 1C | boric acid | methanol | 20 | 5 | 1.0 | NM | pass |
| 2A | boric acid | methanol/glycerol (90:10) | 20 | 12 | 2.4 | 0.0014 | NM |
| 2B | boric acid | methanol/glycerol (90:10) | 20 | 10 | 2.0 | NM | pass |
| 2C | boric acid | methanol/glycerol (90:10) | 20 | 5 | 1.0 | NM | pass |
| 3A | boric acid | ethanol | 12 | 10 | 1.2 | 0.0007 | pass |
| 3B | boric acid | ethanol | 12 | 5 | 0.6 | NM | pass |
| 4A | boric acid | glycerin | 20 | 9.8 | 1.96 | 0.0014 | NM |
| 4B | boric acid | glycerin | 20 | 10 | 2.0 | NM | pass |
| 4C | boric acid | glycerin | 20 | 5 | 1.0 | NM | pass |
| 5A | boric acid | water | 10 | 6.9 | 0.69 | 0.0086 (0.0008) | NM |
| 5B | boric acid | water | 10 | 10 | 1.0 | NM | pass |
| 5C | boric acid | water | 10 | 5 | 0.5 | NM | pass |
| 6A | boric acid | water | 4 | 9.8 | 0.39 | 0.0058 (0.0000) | NM |
| 6B | boric acid | water | 4 | 10 | 0.4 | NM | pass |
| 6C | boric acid | water | 4 | 5 | 0.2 | NM | pass |
| 7A | boric acid | water | 8 | 9.9 | 0.79 | 0.0018 (0.0006) | NM |
| 7B | boric acid | water | 8 | 10 | 0.8 | NM | pass |
| 7C | boric acid | water | 8 | 5 | 0.4 | NM | pass |
| 8A | boric acid | water | 12 | 9.8 | 1.18 | 0.0022 (0.0013) | NM |
| 8B | boric acid | water | 12 | 10 | 1.2 | NM | pass |
| 8C | boric acid | water | 12 | 5 | 0.6 | NM | pass |
| 9A | boric acid | water | 12 | 4.9 | 0.59 | 0.0019 (0.0008) | NM |
| 9B | boric acid | water | 12 | 10 | 1.2 | NM | pass |
| 9C | boric acid | water | 12 | 5 | 0.6 | NM | pass |
| 10A | boric acid | water/ethylene glycol (98:2) | 9.8 | 4.85 | 0.47 | 0.001 (0.0009) | NM |
| 10B | boric acid | water/ethylene glycol (98:2) | 9.8 | 10 | 0.98 | NM | pass |
| 10C | boric acid | water/ethylene glycol (98:2) | 9.8 | 5 | 0.49 | NM | pass |
| Comparative Example D | BX | water | 10 | 10.3 | 1.03 | 0.0106 (0.0068) | fail |
| 11A | BX | water/ethylene glycol (98:2) | 10 | 10 | 10 | 0.0011 (0.0003) | pass |
| 11B | BX | water | 10 | 5 | 0.5 | 0.0011 (0.0003) | pass |

TABLE 2-continued

| EXAMPLE | SOLUTION Material | Added Solvent | Percent Solids By Weight | COATING WEIGHT, Grams Wet | Calculated Dry Add On Weight | EROSION RATE, gram/hour (Standard Deviation, gram/hour) | FLEXIBILITY TEST, pass/fail |
|---|---|---|---|---|---|---|---|
| Comparative Example E | ammonium pentaborate octahydrate | methanol | 10 | 10.8 | 1.08 | 0.0033 (0.0015) | fail |
| 12A | ammonium pentaborate octahydrate | water/glycerol (98:2) | 10 | 10 | 1.0 | 0.0008 (0.0006) | pass |
| 12B | ammonium pentaborate octahydrate | methanol | 10 | 5 | 0.5 | 0.0015 (0.0002) | pass |
| Comparative Example F | potassium tetraborate tetrahydrate | water | 10 | 10 | 1.0 | 0.0031 (0.0015) | fail |
| 13A | potassium tetraborate tetrahydrate | water/glycerol (98:2) | 10 | 10 | 1.0 | 0.0004 (0.0004) | pass |
| 13B | potassium tetraborate tetrahydrate | water | 10 | 5 | 0.5 | 0.0011 (0.0003) | pass |
| 14A | MAP | water | 10 | 9.3 | 0.93 | 0.0015 (0.0003) | NM |
| 14B | MAP | water | 10 | 10 | 1.0 | NM | pass |
| 14C | MAP | water | 10 | 5 | 0.5 | NM | pass |
| 15A | 87% boric acid, 13% SIL1 | water/ethylene glycol (98:2) | 10.3 | 3.96 | 0.41 | 0.0013 (0.0005) | NM |
| 15B | 87% boric acid, 13% SIL1 | water/ethylene glycol (98:2) | 10.3 | 10 | 1.03 | NM | pass |
| 15C | 87% boric acid, 13% SIL1 | water/ethylene glycol (98:2) | 10.3 | 5 | .052 | NM | pass |
| 16A | 78% boric acid, 22% SIL1 | water/ethylene glycol (98:2) | 10.6 | 3.78 | 0.40 | 0.0008 (0.0000) | NM |
| 16B | 78% boric acid, 22% SIL1 | water/ethylene glycol (98:2) | 10.6 | 10 | 1.06 | NM | pass |
| 16C | 78% boric acid, 22% SIL1 | water/ethylene glycol (98:2) | 10.6 | 5 | 0.53 | NM | pass |
| 17 | PHOS | NA | NA | 9.2 | NA | 0.0004 | pass |
| 18 | 83% PHOS, 17% SIL1 | water | NA | 21 | NA | 0.0006 | pass |
| 19 | 71% PHOS, 29% SIL1 | water | NA | 23 | NA | 0.0004 | pass |
| 20 | 63% PHOS, 37% SIL1 | water | NA | 24 | NA | 0.0008 | pass |
| 21 | 55% PHOS, 45% SIL1 | water | NA | 25 | NA | 0.0008 | pass |
| 22 | 50% PHOS, 50% SIL1 | water | NA | 26 | NA | 0.0004 | pass |
| Comparative Example G | CAL | NA | 30 | 9.6 | 2.88 | 0.0008 | fail |
| 23 | 83% PHOS, 17% CAL | water | NA | 17 | NA | 0.0008 | pass |

Examples 24-25 and Comparative Examples H-I

Various edge treatments were applied to MAT4 according to the following procedure. The edge treatment material was dissolved in the indicated solvent(s) and allowed to stabilize over night.

Specimens, 7 inches (18 cm)×7 inches (18 cm), of MAT4 were cut from a common roll. One edge of each sample was dipped into a shallow pan containing approximately 10 grams of solution as indicated in Table 3. The pan was a 9 inches×12 inches (23 cm×30.5 cm) and about 1 inch deep (2.5 cm). The pan was position with a slight incline (15 degrees) to concentrate the solution to the 9 inch side of the pan. Typically, less than five seconds was enough time to allow capillary action to wick the solution evenly into the support mat. The procedure was repeated for each experimental condition. After the samples were dipped in the solution they were allowed to dry overnight at room temperature.

Two drops of SURF1 was added for every 100 grams of water-based solution to aide absorption into the mat. Prior to application, water-based solutions and the pan were heated to 80° C. Samples in other solvents were applied at room temperature. The specimens were tested according to the Cold Erosion Test. The mount density was 0.245 g/cm³. The observed erosion rate in grams per hour is reported in Table 3 (below).

Two drops of SURF2 was added for every 100 grams of water-based solution to aide absorption into the mat. Prior to application, water-based solutions and the pan were heated to 80° C. The specimens were tested according to the Cold Erosion Test. The mount density was 0.59 g/cm³. The observed erosion rate in grams per hour is reported in Table 4 (below). For Example 21, the mat was first dipped into 2 grams of 10% MAP, then while still wet dipped into 3 grams of 10% boric acid solution both at 80° C.

TABLE 3

| EXAMPLE | SOLUTION | | | COATING WEIGHT, grams | | EROSION RATE, gram/hour | FLEXIBILITY |
| | Material | Added Solvent | Percent Solids By Weight | Wet | Calculated Dry Add On Weight | (Standard Deviation, gram/hour) | TEST, pass/fail |
|---|---|---|---|---|---|---|---|
| Comparative Example H | none | none | not applicable | not applicable | not applicable | 0.0111 (0.0022) | pass |
| 24 | boric acid | ethanol | 10 | 9.9 | 0.99 | 0.0011 (0.0002) | pass |
| 25 | ammonium pentaborate octahydrate | methanol | 10 | 9.8 | 0.98 | 0.0011 (0.0003) | pass |
| Comparative Example I | potassium tetraborate tetrahydrate | water | 10 | 9.7 | 0.97 | 0.0006 (0.0002) | fail |

Examples 26-31 and Comparative Example J

Various edge treatments were applied to MAT5 according to the following procedure. The edge treatment material was dissolved in the indicated solvent(s) and allowed to stabilize over night.

TABLE 4

| EXAMPLE | SOLUTION | | | COATING WEIGHT, grams | | EROSION RATE, gram/hour | FLEXIBILITY |
| | Material | Added Solvent | Percent Solids By Weight | Wet | Calculated Dry Add On | (Standard Deviation, gram/hour) | TEST, pass/fail |
|---|---|---|---|---|---|---|---|
| Comparative Example J | None | none | not applicable | not applicable | not applicable | 0.0151 (0.0022) | pass |
| 26 | boric acid | water | 10 | 5 | 0.5 | 0.0007 (0.0002) | pass |
| 27 | MGPHOS | water | 31 | 5 | 1.55 | 0.0004 (0.000) | pass |
| 28 | 60% boric acid, 40% MAP | water | not applicable | 5 | 0.5 | 0.0014 (0.0007) | pass |
| 29 | 27% boric acid, 73% magnesium nitrate | water | 10 | 5 | 0.5 | 0.001 (0.0007) | pass |
| 30 | boric acid | water | 10 | 1.7 | 0.17 | 0.0025 (0.0004) | pass |
| 31 | MAP | water | 10 | 2.1 | 0.21 | 0.0013 (0.000) | pass |

Specimens, 7 inches (18 cm)×7 inches (18 cm), of MAT5 were cut from a common roll. One edge of each sample was dipped into a shallow pan containing 5 grams of a solution as indicated in Table 4. The pan was a 9 inches×12 inches (23 cm×30.5 cm) and about 1 inch deep (2.5 cm). The pan was position with a slight incline (15 degrees) to concentrate the solution to the 9 inch side of the pan. Typically, less than five seconds was enough time to allow capillary action to wick the solution evenly into the support mat. The procedure was repeated for each experimental condition. After the samples were dipped in the solution they were allowed to dry overnight at room temperature.

Example 32 and Comparative Example K

Edge treatments were applied to MAT1 according to the following procedure. The edge treatment material was dissolved in the indicated solvent and allowed to stabilize over night.

Specimens, 7 inches (18 cm)×7 inches (18 cm), of MAT1 were cut from a common roll. One edge of each sample was dipped into a shallow pan containing approximately 10 grams of the solution as indicated in Table 5. The pan was a 9 inches×12 inches (23 cm×30.5 cm) and about 1 inch deep (2.5 cm). The pan was position with a slight incline (15 degrees) to concentrate the solution to the 9-inch side of the pan. Typically, less than five seconds was enough time to allow capillary action to wick the solution evenly into the support mat. The procedure was repeated for each experimental condition. After the samples were dipped in the solution they were allowed to dry overnight at room temperature.

The specimens were tested according to the Hot Erosion Test. The mount density was 0.7 g/cm³. The observed erosion rate in grams per hour is reported in Table 5 (below).

TABLE 5

| EXAMPLE | SOLUTION | | COATING WEIGHT, grams | | EROSION RATE, gram/hour | FLEXIBILITY TEST, pass/fail |
| | Material | Added Solvent | Percent Solids By Weight | Wet | Calculated Dry Add On | | |
|---|---|---|---|---|---|---|---|
| Comparative Example K | none | none | not applicable | not applicable | not applicable | 0.0733 | pass |
| 32 | boric acid | ethanol | 12 | 10 | 1.2 | 0.0013 | pass |

Various modifications and alterations of this invention may be made by those skilled in the art without departing from the scope and spirit of this invention, and it should be understood that this invention is not to be unduly limited to the illustrative embodiments set forth herein.

What is claimed is:

1. An erosion resistant mounting material comprising:
a mounting material comprising inorganic fibers and having a plurality of peripheral edges, the plurality of peripheral edges comprising a first peripheral edge; and
a layer of reinforcing composition inwardly disposed on the mounting material along the first peripheral edge, but not contacting a majority of the mounting material;
wherein, on a dry weight basis, at least one compound represented by the formula comprises a majority of the reinforcing composition, wherein
each $M^{m+}$ independently represents a cationic species, other than $H^+$, having a positive charge of $m+$; and
$(Z_pO_q(OH)_r)^{n-}$ represents a species having a charge of $n-$, wherein Z represents boron, and further wherein:
f is a real number greater than or equal to zero;
d, n, q, and r are integers greater than or equal to zero;
e, m, and p are integers greater than or equal to one; and
d times m equals e times n; and
wherein the erosion resistant mounting material is flexible.

2. The erosion resistant mounting material of claim 1, wherein each $M^{m+}$ is independently selected from the group consisting of metal cations and $NR_4^+$ wherein each R independently represents $H^+$ or an alkyl group.

3. The erosion resistant mounting material of claim 1, wherein the reinforcing composition is essentially free of organic components.

4. The erosion resistant mounting material of claim 1, wherein the layer of reinforcing composition has an inward thickness of less than or equal to one centimeter.

5. The erosion resistant mounting material of claim 1, wherein at least a portion of the inorganic fibers are bonded together by a binder.

6. The erosion resistant mounting material of claim 1, wherein the binder comprises organic material.

7. The erosion resistant mounting material of claim 1, wherein the mounting material has a dry basis weight of from 0.4 to 15 kilograms per square meter.

8. The erosion resistant mounting material of claim 1, wherein the mounting material further comprises an unexpanded intumescent material.

9. The erosion resistant mounting material of claim 8, wherein the unexpanded intumescent material comprises vermiculite, graphite, or a combination thereof.

10. The erosion resistant mounting material of claim 1, wherein the inorganic fibers comprise ceramic fibers.

11. The erosion resistant mounting material of claim 1, adapted for use in a pollution control device.

12. A pollution control device comprising:
a housing;
a pollution control element disposed within the housing; and
the erosion resistant mounting material of claim 1 disposed between the pollution control element and the housing.

13. A method of making a pollution control device, the method comprising:
disposing the erosion resistant mounting material of claim 1 within a housing having a pollution control element disposed therein such that the erosion resistant mounting material is disposed between the pollution control element and the housing.

14. A method of making an erosion resistant mounting material, the method comprising:
providing a mounting material comprising inorganic fibers and a plurality of peripheral edges, the plurality of peripheral edges comprising a first peripheral edge; and
applying a dryable solution comprising a reinforcing composition dissolved in a liquid vehicle to the inorganic fibers along the first peripheral edge; and
substantially drying the dryable solution to provide a layer comprising the reinforcing composition inwardly disposed along the first peripheral edge, but not contacting a majority of the mounting material;
wherein, on a dry weight basis, at least one compound represented by the formula comprises a majority of the reinforcing composition, wherein
each $M^{m+}$ independently represents a cationic species, other than $H^+$, having a positive charge of $m+$; and
$(Z_pO_q(OH)_r)^{n-}$ represents a species having a charge of $n-$, wherein Z represents boron, and further wherein:
f is a real number greater than or equal to zero;
d, n, q, and r are integers greater than or equal to zero;
e, m, and p are integers greater than or equal to one; and
d times m equals e times n; and
wherein the erosion resistant mounting material is flexible.

15. The method of claim 14, wherein each $M^{m+}$ is independently selected from the group consisting of metal cations and $NR_4^+$ wherein each R independently represents H or an alkyl group.

16. The method of claim 14, wherein the reinforcing composition is essentially free of organic components.

17. The method of claim 14, wherein the layer of reinforcing composition has an inward thickness of less than or equal to one centimeter.

18. The method of claim 14, wherein the mounting material has a dry basis weight of from 0.4 to 15 kilograms per square meter.

19. The method of claim 14, wherein at least a portion of the inorganic fibers are bonded together by a binder.

20. The method of claim 19, wherein the binder comprises organic material.

21. The method of claim 14, wherein the mounting material further comprises an unexpanded intumescent material.

22. The method of claim 21, wherein the unexpanded intumescent material comprises vermiculite, graphite, or a combination thereof.

23. The method of claim 14, wherein the inorganic fibers comprise ceramic fibers.

24. The method of claim 14, further comprising adapting the erosion resistant mounting material for use in a pollution control device.

* * * * *

UNITED STATES PATENT AND TRADEMARK OFFICE
CERTIFICATE OF CORRECTION

PATENT NO.       : 8,617,475 B2                                    Page 1 of 1
APPLICATION NO.  : 12/663712
DATED            : December 31, 2013
INVENTOR(S)      : Peter Dietz It is certified that error appears in the above-identified patent and that said Letters Patent is hereby corrected as shown below:

In the Specification

Column 1
Line 11, Delete "tiled" and insert -- filed --, therefor.

In the Claims

Column 20
Line 51, In Claim 14, delete "$(M^{m+})_d((Z_pO_{rq}(OH)_r)^{n-})_e.(H_2O)_f$" and insert
-- $(M^{m+})_d((Z_pO_q(OH)_r)^{n-})_e \bullet (H_2O)_f$ --, therefor.

Signed and Sealed this
Twenty-sixth Day of August, 2014

Michelle K. Lee
*Deputy Director of the United States Patent and Trademark Office*